(12) United States Patent
Yang

(10) Patent No.: US 10,107,450 B2
(45) Date of Patent: Oct. 23, 2018

(54) LUBRICANT INJECTOR

(71) Applicant: KLT CO., LTD., Paju-si, Gyeonggi-do (KR)

(72) Inventor: Yun jong Yang, Seoul (KR)

(73) Assignee: KLT CO., LTD. (KR)

( * ) Notice: Subject to any disclaimer, the term of this patent is extended or adjusted under 35 U.S.C. 154(b) by 198 days.

(21) Appl. No.: 15/212,642

(22) Filed: Jul. 18, 2016

(65) Prior Publication Data

US 2016/0334058 A1     Nov. 17, 2016

Related U.S. Application Data

(63) Continuation of application No. PCT/KR2015/002152, filed on Mar. 5, 2015.

(30) Foreign Application Priority Data

Mar. 7, 2014  (KR) .................. 10-2014-0026955

(51) Int. Cl.
| *F16N 3/12* | (2006.01) |
| *F16N 13/08* | (2006.01) |
| *F16N 11/08* | (2006.01) |
| *F16N 13/14* | (2006.01) |
| *F16N 23/00* | (2006.01) |
| *F16N 13/06* | (2006.01) |

(52) U.S. Cl.
CPC .............. *F16N 11/08* (2013.01); *F16N 13/14* (2013.01); *F16N 23/00* (2013.01); *F16N 2013/063* (2013.01)

(58) Field of Classification Search
CPC .......... F16N 11/08; F16N 11/02; F16N 11/04; F16N 13/02; F16N 2013/066
USPC ......................................... 184/38.4
See application file for complete search history.

(56) References Cited

U.S. PATENT DOCUMENTS

| 1,223,019 | A | * | 4/1917 | Zerk | ................... F16N 11/02 |
| | | | | | 184/38.4 |
| 1,283,628 | A | * | 11/1918 | Beach | ................... F16N 11/02 |
| | | | | | 184/38.4 |
| 1,465,253 | A | * | 8/1923 | Cummins | ............... F16N 11/02 |
| | | | | | 184/38.1 |
| 1,936,261 | A | * | 11/1933 | Pierson | .............. A46B 11/0027 |
| | | | | | 184/38.4 |

(Continued)

*Primary Examiner* — Henry Y Liu
(74) *Attorney, Agent, or Firm* — Park & Associates IP Law, P.C.

(57) ABSTRACT

The purpose of the present invention is to provide a lubricant injector that implements extrusion and pumping of a lubricant using a single power source, and that can intermittently perform the extrusion of the lubricant, the lubricant injector including: a storage unit including: a storage chamber filled with a lubricant; a piston provided in the storage chamber; a screw shaft coupled to the piston to lift and lower the piston while rotating; a following gear provided on a lower end of the screw shaft; and an elastic support member provided to elastically support the following gear; a power generation unit provided to provide a rotation driving force; and an emission unit including: a cylindrical cam rotating by operating in conjunction with the power generation unit; a driving gear provided on an upper end of the cylindrical cam; a plunger pumping the introduced lubricant; and a discharge passage.

8 Claims, 6 Drawing Sheets

(56) References Cited

U.S. PATENT DOCUMENTS

| | | | | | |
|---|---|---|---|---|---|
| 4,018,305 | A | * | 4/1977 | Tietje | F16N 11/04 184/45.1 |
| 4,375,246 | A | * | 3/1983 | Tietje | F16N 11/04 184/45.1 |
| 5,271,528 | A | * | 12/1993 | Chien | F16N 11/08 184/38.4 |
| 5,634,531 | A | * | 6/1997 | Graf | F16N 11/08 184/108 |
| 5,638,920 | A | * | 6/1997 | Gruett | F16N 7/34 184/39.1 |
| 5,971,229 | A | * | 10/1999 | May | F16N 11/08 222/327 |
| 6,216,822 | B1 | * | 4/2001 | May | F16N 11/08 184/105.1 |
| 6,408,985 | B1 | * | 6/2002 | Orlitzky | F16N 11/08 184/105.2 |
| 6,601,738 | B2 | * | 8/2003 | Weigand | F16N 11/08 184/37 |
| 6,802,394 | B2 | * | 10/2004 | Patterson | F16N 11/04 184/105.1 |
| 7,228,941 | B2 | * | 6/2007 | Weigand | F16N 11/08 184/7.4 |
| 8,783,418 | B2 | * | 7/2014 | Orlitzky | F16N 13/14 184/37 |
| 9,151,443 | B2 | * | 10/2015 | Orlitzky | F16N 11/08 |
| 2013/0168188 | A1 | * | 7/2013 | Donovan | F16N 7/14 184/6 |

\* cited by examiner

LUBRICANT INJECTOR

REFERENCE TO RELATED APPLICATIONS

This is a continuation of pending International Patent Application PCT/KR2015/002152 filed on Mar. 5, 2015, which designates the United States and claims priority of Korean Patent Application No. 10-2014-0026955 filed on Mar. 7, 2014, the entire contents of which are incorporated herein by reference.

FIELD OF THE INVENTION

The present invention relates generally to a lubricant injector. More particularly, the present invention relates to a lubricant injector that is provided at a location which requires lubricating due to mechanical friction, thereby enabling automatic injection of lubricant.

BACKGROUND OF THE INVENTION

A lubricant injector used at a location at which mechanical friction occurs in a normal mechanical device for industry has become widespread and is being used in many industrial fields. Although the use of the lubricant injector is increasing, problems may occur when the lubricant injector is used in industrial settings. These problems occur due to the following reasons.

First, a lubricant injector is a device for injecting lubricant, that is, grease, and the grease is made up of a thickener, a base oil, and an additive that are combined physically but not chemically. That is, the thickener functions to hold oil, which can be released from the thickener when a force is applied thereto. This idea is analogous to the idea of a sponge holding water and then releasing the water when squeezed. Accordingly, when a predetermined pressure or stress is applied to grease, oil is automatically separated from a thickener. Measuring the separation of the oil from the thickener is referred to as bleeding. The higher the bleeding, the more easily oil separates from the thickener.

Accordingly, the lubricant injector normally uses the following two methods according to a method of discharging grease by applying pressure to the grease. One method is a gas discharge method normally using nitrogen gas or hydrogen gas, in which when gas, regardless of being nitrogen gas or hydrogen gas, is generated from a gas generating device, and the generated gas regularly applies pressure to a piston, grease is discharged by the pressure. When the gas continuously presses the piston for a long period of time, from one month to one year, oil is separated from grease, and thus the oil comes gradually out from an inside of a container. In the end, at one point, only a thickener is left and hardened in the container like mud, and thus it becomes impossible to discharge the thickener any longer by using pressure of the gas. In this case, since the grease may be misperceived to remain at normal levels in the container, the grease may be neglected, thus possibly leading to bearing damage.

Next, a mechanical discharge method developed to overcome a disadvantage of the above-mentioned gas discharge method includes two methods widely used in various industrial fields. One method is a screw down method, and the other method is a method using a positive displacement pump. Although the screw down method is relatively advantageous in terms of bleeding, the screw down method has a limitation in that it has low grease discharge pressure.

According to the related art having the above-mentioned structure disclosed in U.S. Pat. No. 7,229,941 B2, a wedge-shaped slide surface is attached to a lower part of a gear wheel, the wedge-shaped slide surface being connected to a ram, and rotation of the gear wheel allows the ram to move up and down along an opposing wedge-shaped slide surface that is connected to the ram and positioned under the wedge-shaped slide surface. As the ram moves up and down, grease is compressed and discharged. Accordingly, a structure of a lubricant injector using the screw down method is very complicated, and is high in manufacturing cost and energy consumption. Further, it is necessary to lift a wedge slide by using the force of a spring, and high resistance occurs in the case of low temperature or slow movement of grease according to viscosity of the grease, thus the amount of discharged grease may change. Additionally, since a storage chamber for storing lubricant is configured to have a dual structure made up of an inner container and an outer cover, changing the storage chamber causes inconveniences, and it is structurally impossible to feed oil.

The method using the positive displacement pump developed to solve a problem of the screw down method is advantageous in that the positive displacement pump can obtain a higher discharge pressure by suctioning and compressing grease after connecting a pump to a small motor. However, since a spring continues to apply pressure to the grease from a part above the pump such that the grease is efficiently introduced into the pump, separation of oil from the grease occurs at one point as in the gas discharge method, and when the separation of oil occurs, grease movement slows down. Accordingly, since the grease is prevented from being efficiently introduced into the pump and thus an injection hole is clogged, grease discharge is stopped.

SUMMARY OF THE INVENTION

Accordingly, the present invention has been made keeping in mind the above problems occurring in the related art, and the present invention is intended to propose a lubricant injector that can perform extrusion and pumping of lubricants at the same time by using a single power source, and can perform the function of a clutch for responding to a change of pressure due to difference in the amounts of the lubricants caused by the extrusion and pumping.

In order to achieve the above object, according to one aspect of the present invention, there is provided a lubricant injector including: a storage unit including: a storage chamber filled with a lubricant; a piston provided in the storage chamber; a screw shaft coupled to the piston so as to lift and lower the piston while rotating; a following gear provided on a lower end of the screw shaft; and an elastic support member provided on one side of the screw shaft so as to elastically support the following gear; a power generation unit provided on one side of a lower portion of the storage unit so as to provide a rotation driving force; and an emission unit including: a cylindrical cam rotating by operating in conjunction with the power generation unit; a driving gear provided on an upper end of the cylindrical cam, the driving gear meshing with the following gear such that a space through which the lubricant is introduced into the cylindrical cam is defined; a plunger pumping the introduced lubricant while moving up and down in the cylindrical cam by operating in conjunction with the cylindrical cam that rotates; and a discharge passage formed in the plunger such that the pumped lubricant can be discharged to target locations, wherein the following gear and the driving gear intermittently mesh with each other according to a change of pressure in the storage chamber.

In addition, the storage chamber may include: a body filled with the lubricant and having an outlet hole formed at a predetermined portion of a lower part of the body; and a cover removably provided on an upper part of the body.

Furthermore, the elastic support member may be provided between the screw shaft and the cover.

Meanwhile, the elastic support member may be provided between the following gear that is installed on the lower end of the screw shaft such that the following gear slides on an outer circumferential surface of the screw shaft, and a stop ring formed on the outer circumferential surface of the screw shaft at a location above the following gear.

Next, the discharge passage may be provided with a first check valve to enable unidirectional discharge of the lubricant.

Additionally, the cylindrical cam may be provided with an auxiliary discharge passage thereunder that communicates with the discharge passage, the auxiliary discharge passage being provided with a second check valve that enables unidirectional discharge of the lubricant.

In addition, the piston may be provided with a lubricant hole formed through the piston so as to supply the lubricant to a part under the piston, with a stopper removably installed in the lubricant hole.

Furthermore, the power generation unit may include: a driving motor; a reduction gear operating in conjunction with the driving motor; and a pinion causing cooperation of the reduction gear and the cylindrical cam.

According to the present invention having the above-described characteristics, it is possible to realize the following effects.

First, a lubricant injector allows a piston operating in conjunction with a screw shaft to compress lubricant so as to introduce the lubricant into a cylindrical cam, allows a plunger moving up and down along a track set on an inner surface of the cylindrical cam to discharge the lubricant to target locations by pressing the introduced lubricant, and allows a check valve to stop reverse pressure caused by the discharged lubricant, thereby performing a stable pumping of the lubricant, decreasing the bleeding of the lubricant occurring due to the lubricant compressed for a long period of time, and solving the problem of a low discharge pressure of a screw down method at the same time.

In addition, since the lubricant injector can perform extrusion and pumping of the lubricant via a single power source, the lubricant injector is simple in structure, thereby decreasing manufacturing cost, and allowing use even in a narrow space.

Furthermore, by performing the function of a clutch whereby a following gear and a driving gear intermittently mesh with each other, the lubricant injector can overcome differences in amounts of the lubricants caused by the extrusion of the lubricant performed by the piston, and the pumping of the lubricant performed by the plunger via the single power source, thereby preventing stagnation of the lubricants .

DETAILED DESCRIPTION OF THE INVENTION

Reference will now be made in greater detail to a first embodiment of the present invention hereinbelow, an example of which is illustrated in the accompanying drawings.

Figure 1:
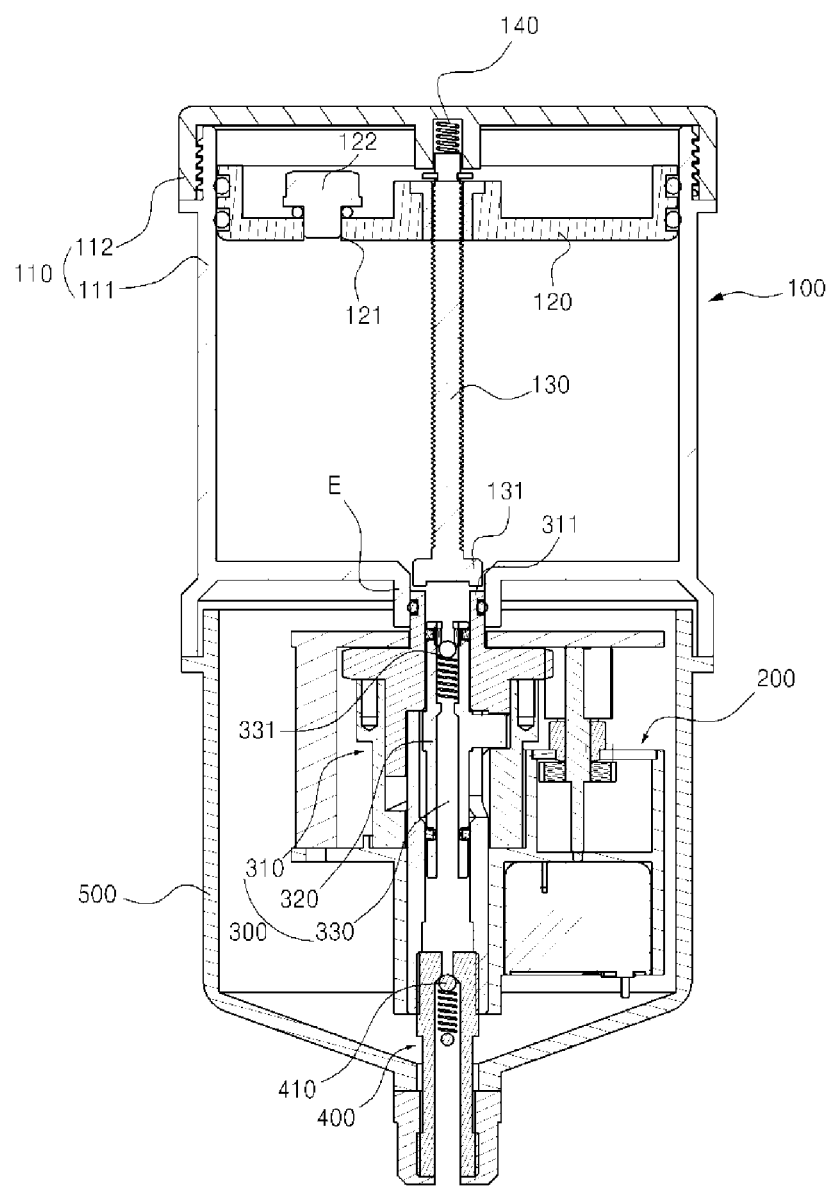
FIG. 1 is a cross-sectional view of a lubricant injector according to a first embodiment of the present invention.
Figure 2:
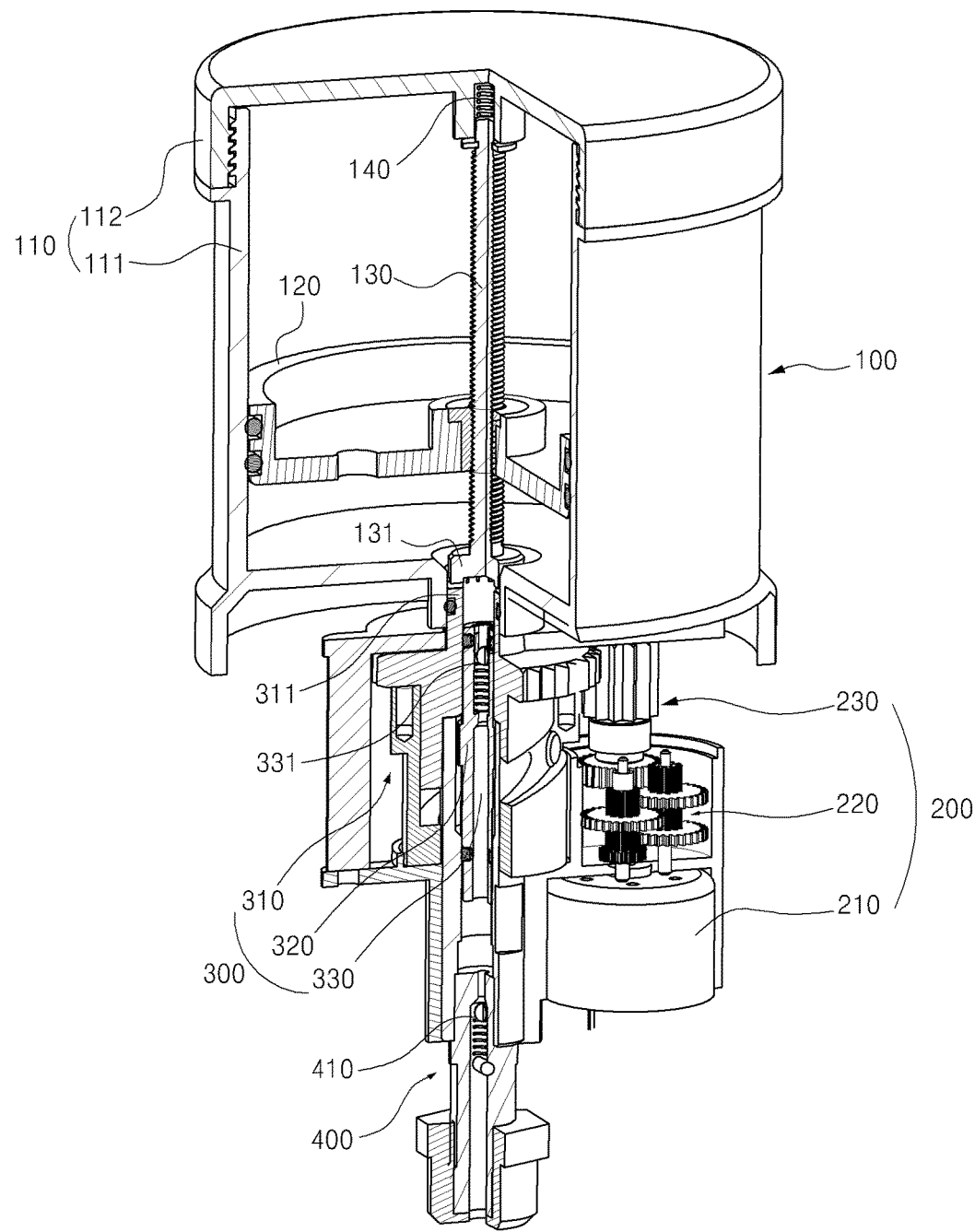
FIG. 2 is a perspective view of the lubricant injector according to the first embodiment of the present invention.

As shown in FIGS. 1 and 2 illustrating a cross-sectional view and a perspective view, respectively, of a lubricant injector according to the first embodiment of the present invention, the lubricant injector includes a storage unit 100, a power generation unit 200, and an emission unit 300.

First, the storage unit 100 stores a lubricant therein after being filled with the lubricant used at a location where mechanical friction occurs, and extrudes the lubricant to the emission unit 300, wherein the storage unit 100 includes a storage chamber 110, a piston 120, a screw shaft 130, a following gear 131, and an elastic support member 140.

The storage chamber 110 provides a space in which lubricant is filled and stored, and includes a body 111 and a cover 112. The body 111 provides the space in which the lubricant is filled and stored, and is provided with an outlet hole E through which the lubricant is extruded, the outlet hole E being formed at a predetermined portion of a lower part of the body 111. Further, the cover 112 is removably provided on an upper part of the body 111 for changing and feeding lubricant.

In addition, the piston 120 is provided in the storage chamber 110 to compress the lubricant, and since the piston 120 is coupled to the screw shaft 130, the piston compresses the lubricant by being lifted and lowered by rotation of the screw shaft 130.

Furthermore, the screw shaft 130 is rotated by a rotation driving force received from the emission unit 300, and is provided with the following gear 131 on a lower end of the screw shaft 130 so as to operate in conjunction with the emission unit 300. Here, the piston 120 is provided with a lubricant hole 121 formed through the piston so as to supply the lubricant to a part under the piston and fill the storage chamber 110 with the lubricant, wherein a stopper 122 is removably installed in the lubricant hole 121 so as to make feeding and changing of the lubricant efficient.

In addition, the elastic support member 140 is provided between an upper end of the screw shaft 130 and the cover 112 so as to elastically apply pressure to the screw shaft 130 toward the outlet hole E. The elastic support member 140 lowers the screw shaft 130 by pressing down the screw shaft 130, or allows the screw shaft 130 to lift while being pressed by the screw shaft 130 according to difference between an amount of a lubricant to be extruded from the storage unit 100 and an amount of a lubricant to be discharged from the emission unit 300, that is, a difference in amounts of lubricants. Although various members having elastic forces may be used as the elastic support member 140, it is preferred that a coil spring is used.

Next, the power generation unit 200 is provided on one side of a lower portion of the storage unit 100 so as to supply the rotation driving force to the emission unit 300, and includes a driving motor 210, a reduction gear 220, and a pinion 230. The driving motor 210 receives an electrical signal from a control panel (not shown), and generates the rotation driving force. Further, the reduction gear 220 is connected to the driving motor 210, and is operated by the control of the control panel. Additionally, the pinion 230 causes cooperation of the reduction gear 220 and a cylindrical cam 310 of the emission unit 300, which will be described hereinafter, so as to provide the rotation driving force to the cylindrical cam.

Accordingly, as shown in the above-described FIGS. 1-3, 4(A) and 4(B) illustrating the perspective views and the perspective views of the separation and combination, respectively, of a driving gear and the following gear according to the first embodiment of the present invention, the emission unit 300 transmits the rotation driving force to the screw shaft 130 so as to pump and discharge the extruded lubricant, wherein the emission unit 300 includes the cylindrical cam 310, a plunger 320, and a discharge passage 330.

The cylindrical cam 310 is configured to be hollow therein, and rotates by operating in conjunction with the pinion 230. The cylindrical cam 310 drives the screw shaft 130 and the plunger 320 via a single power source, and to this end, is configured to be hollow in the cylindrical cam. The cylindrical cam 310 is provided with the driving gear 311 on an upper end thereof that meshes with the following gear 131, and the driving gear 311 meshes with the following gear 131 such that at least one space S through which the lubricant is introduced into the cylindrical cam 310 is defined, and the plunger 320 is provided so as to move up and down in the cylindrical cam 310 according to the rotation of the cylindrical cam.

Figure 3:
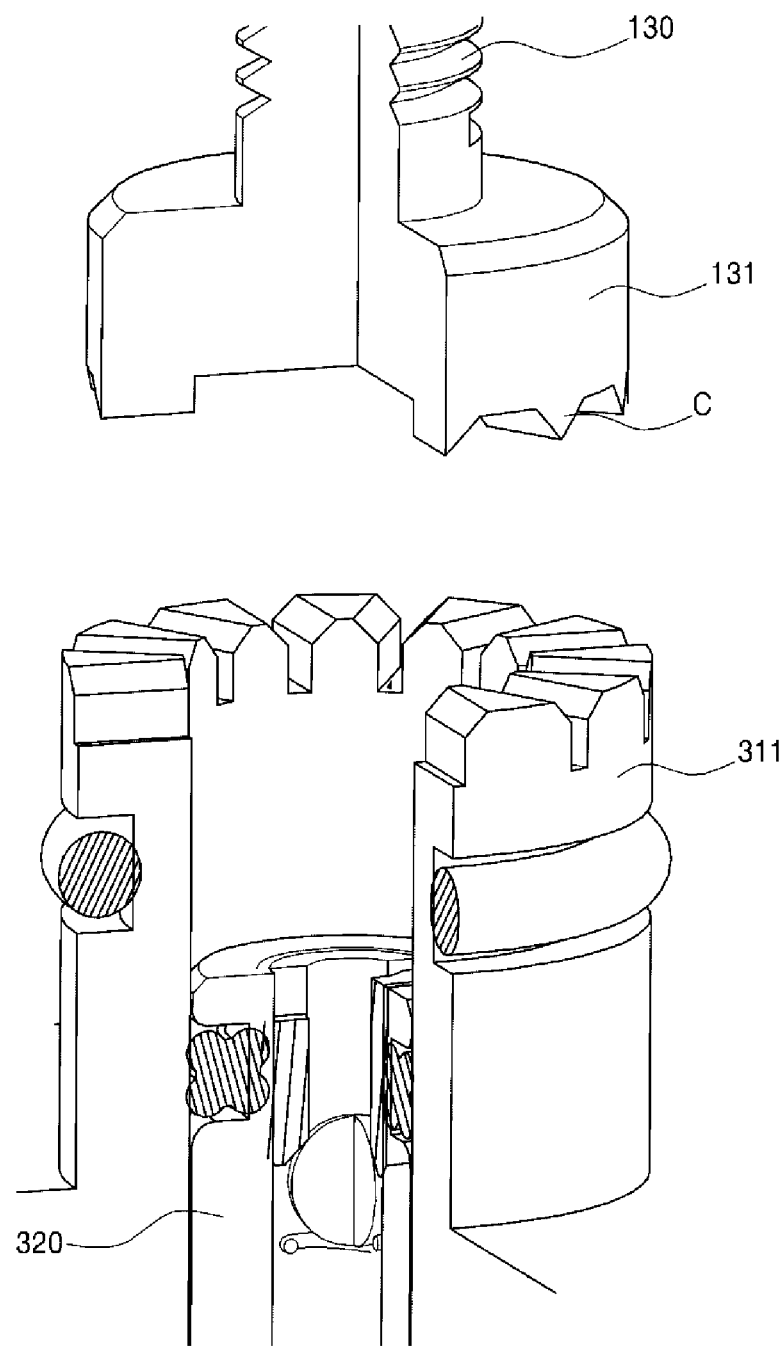
FIG. 3 shows perspective views of a driving gear and a following gear according to the first embodiment of the present invention.

Accordingly, a structure of portions on which the driving gear 311 and the following gear 131 mesh with each other will be described in detail referring to FIG. 3. The driving gear 311 is formed on an upper end of a part (not shown) protruding from an upper end of the cylindrical cam 310, the part being inserted into the outlet hole E. Further, it is preferred that gear teeth of the following gear 131 are configured to be pointed at end parts thereof so as to properly mesh with gear teeth of the driving gear 311 that is rotating. In addition, the gear teeth of the driving gear 311 are configured to correspond to the gear teeth of the following gear 131 such that the gear teeth of the driving gear easily sit on the gear teeth of the following gear while rotating so as to mesh with the gear teeth of the following gear 131. Further, portions of the driving gear on which the gear teeth of the following gear 131 sit are configured to be depressed in vertical downward directions such that while the following gear 131 and the driving gear 311 mesh with each other, the space S through which the lubricant is introduced into the cylindrical cam 310 is defined.

Additionally, the plunger 320 is provided in the cylindrical cam 310, and pumps the lubricant introduced into a space (referred to a pressure chamber hereinbelow) between an upper end of the cylindrical cam 310 and the plunger 320 while moving up and down in the cylindrical cam 310 by operating in conjunction with the cylindrical cam 310 that rotates, and enables the lubricant to be discharged to the discharge passage 330 provided in the plunger 320.

To be specific, the plunger 320 is provided with a protrusion (not shown) to be inserted to a vertical movement guiding groove (not shown) having a spiral shape formed on an inner surface of the cylindrical cam 310, and vertically reciprocates in the cylindrical cam 310 while the cylindrical cam 310 rotates so as to enable discharge of the lubricant by applying pressure to the pressure chamber.

In addition, the discharge passage 330 is formed in the plunger 320 such that the lubricant pumped in the pressure chamber can be discharged to target locations. The discharge passage 330 is provided with a first check valve 331 to enable unidirectional discharge of the lubricant by preventing a reverse flow of the discharged lubricant.

Next, the storage unit 100 is provided with a casing 500 thereunder so as to protect the power generation unit 200 and the emission unit 300 from an external environment. Further, the casing 500 is provided with a lubricant injection hole on one portion of a lower part thereof (not shown) into which the lubricant discharged through the discharge passage 330 is injected.

Furthermore, the cylindrical cam 310 is further provided with an auxiliary discharge passage 400 thereunder that communicates with the discharge passage 330. A lower part of the auxiliary discharge passage 400 is connected to the lubricant injection hole to enable the lubricant to be introduced to target locations. Additionally, the auxiliary discharge passage 400 is provided with a second check valve 410 to prevent the reverse flow of the lubricant due to the reverse pressure of the lubricant that may occur after the lubricant is introduced to the target locations.

Since in the lubricant injector of the present invention having the above-mentioned configuration, the extrusion of the lubricant by using the piston 120 and the pumping of the lubricant by using the plunger 320 are performed at the same time by the cylindrical cam 310 that rotates, a change of pressure in the pressure chamber due to difference in the amounts of the lubricants may occur, which leads to a change of pressure in the storage chamber 110. That is, a difference in the amounts of the lubricants indicates a difference between an amount of lubricant introduced into the pressure chamber by compression of the piston 120 in the storage chamber 110 and an amount of lubricant discharged through the discharge passage 330 by pumping of the plunger 320.

Figure 4A:
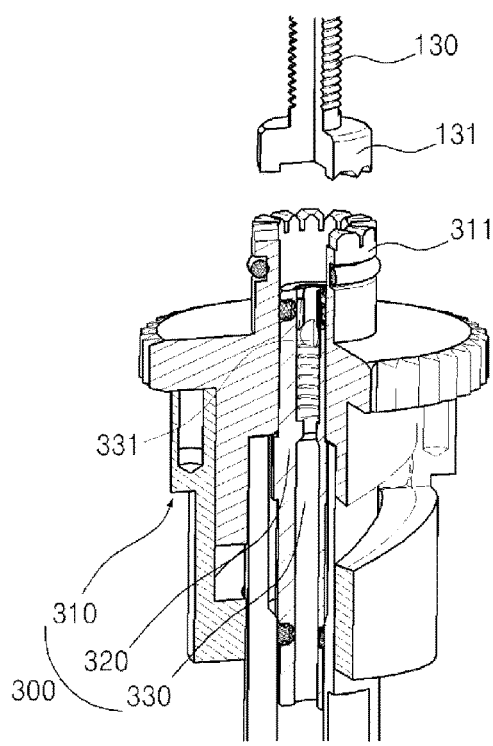
FIGS. 4(A) and 4(B) show perspective views of the separation and combination of the driving gear and the following gear according to the first embodiment of the present invention.
Figure 4B:
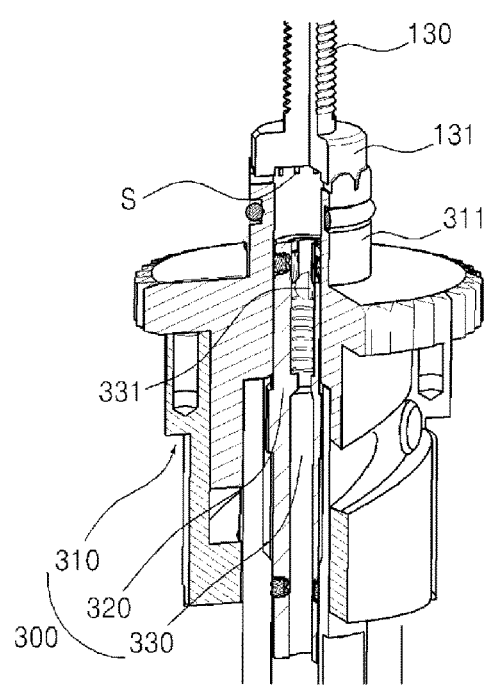

The so-called "function of a clutch" that the following gear 131 and the driving gear 311 intermittently mesh with each other so as to overcome the change of pressure due to the difference of the amounts of the lubricants will be described hereinbelow referring to FIGS. 4(A) and 4(B).

When the cylindrical cam 310 engaged with the pinion 230 rotates, the following gear 131 meshing with the driving gear 311 rotates, and at the same time, when the screw shaft 130 rotates, the piston 120 lowers and applies pressure to the lubricant. The pressed lubricant is introduced into the pressure chamber, and when pumping of the plunger 320 operating in conjunction with the cylindrical cam 310 that rotates allows the piston 120 to continuously apply pressure to the lubricant, the lubricant is extruded to the pressure chamber and pumped, which causes the first check valve 331 of the discharge passage 330 to be opened, and the lubricant to be introduced into the target locations.

Here, when the difference in the amounts of the lubricants occurs, pressure of the pressure chamber increases. When the pressure is greater than an elastic force of the elastic support member 140, the elastic support member 140 is pressed, and thus the screw shaft 130 lifts, and the driving gear 311 and the following gear 131 become spaced apart from each other. Accordingly, the transmission of the rotation driving force is temporarily stopped. When the pressure of the pressure chamber is released, the screw shaft 130 is lowered by a restoring force of the elastic support member 140, and the function of a clutch that the driving gear 311 and the following gear 131 mesh with each other is performed, and thereby the stagnation of the lubricant can be prevented.

In summary, the increase of pressure in the pressure chamber leads to a change of pressure in the storage chamber 110, which causes the stagnation of lubricant mentioned above. To solve the problem, the lubricant injector of the present invention is configured such that the driving gear 311 and the following gear 131 intermittently mesh with each other.

Next, a second embodiment of the present invention will be described in detail.

Figure 5:
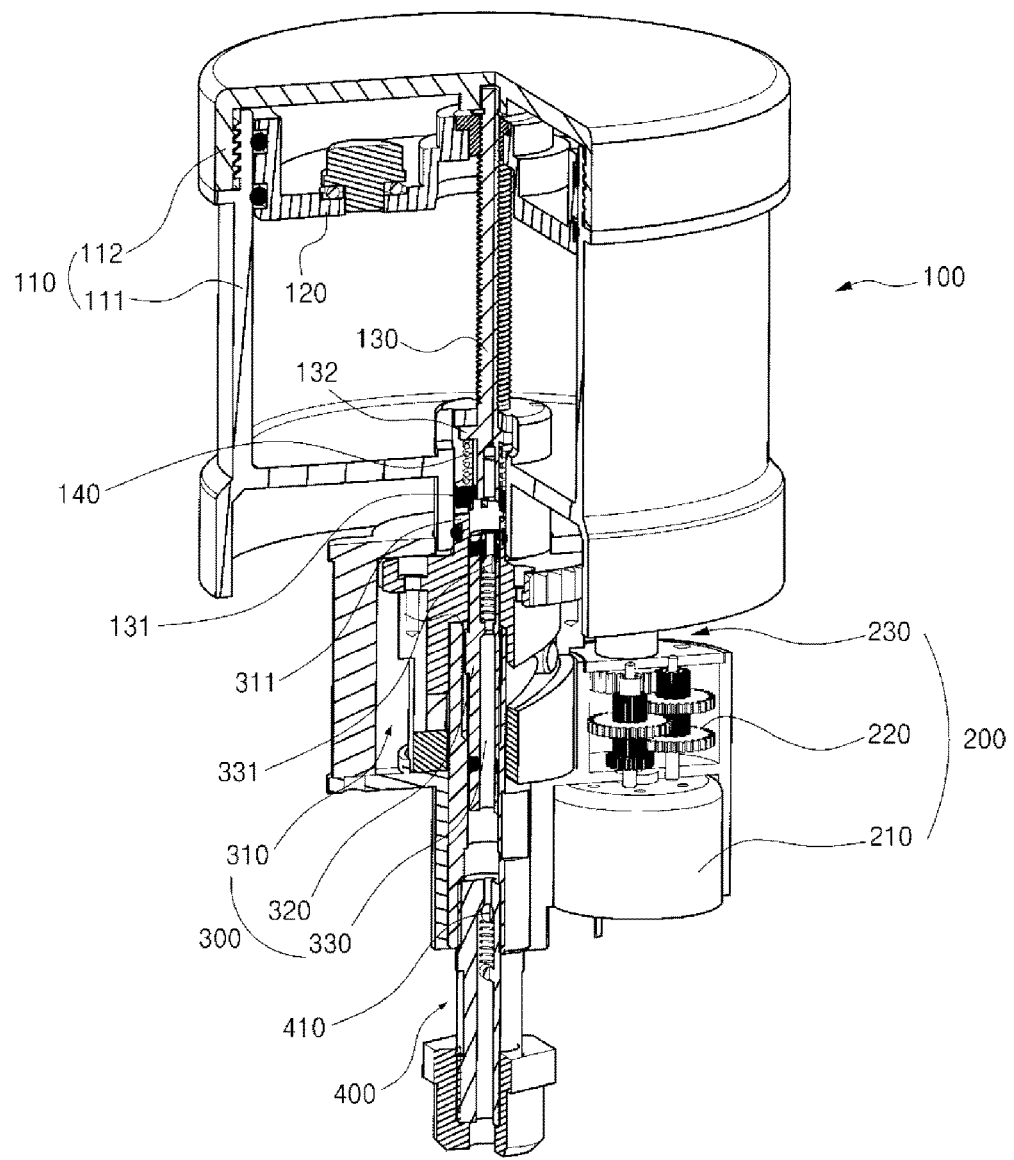
FIG. 5 is a perspective view of a lubricant injector according to a second embodiment of the present invention.

As shown in FIG. 5 illustrating a perspective view of a lubricant injector according to the second embodiment of the present invention, although the elastic support member 140 is provided between the screw shaft 130 and the cover 112 in the first embodiment according to the present invention, the elastic support member 140 is provided between the following gear 131 and a stop ring 132 in the second embodiment according to the present invention. Here, description concerning the configuration of the second embodiment overlapping the first embodiment of the present invention mentioned above will be omitted.

The elastic support member 140 according to the second embodiment of the present invention compared to the elastic support member 140 according to the first embodiment of the present invention will be described in detail.

Figure 6A:
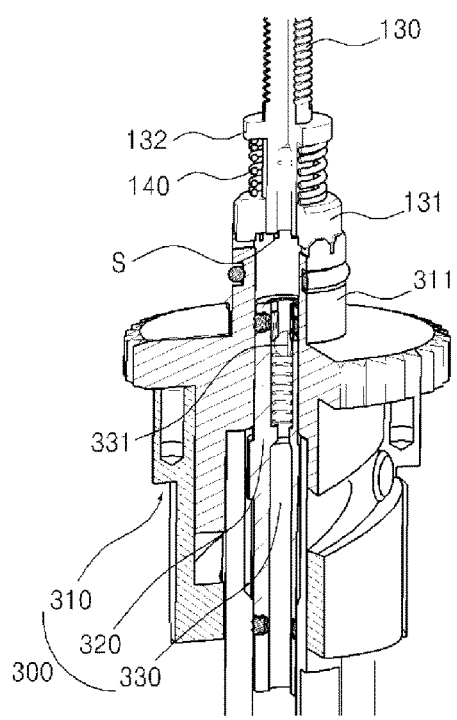
FIGS. 6(A) and 6(B) show perspective views of the separation and combination of a driving gear and a following gear according to the second embodiment of the present invention.
Figure 6B:
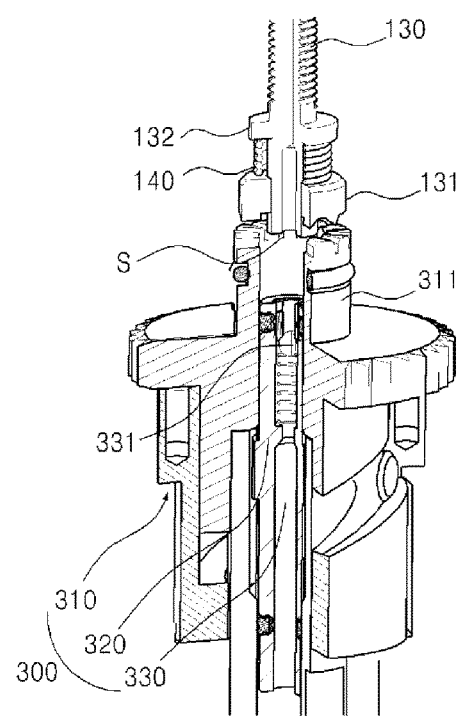

As shown in FIGS. 6(A) and 6(B) illustrating perspective views of the separation and combination of the driving gear and the following gear according to the second embodiment of the present invention, the following gear 131 is provided on a lower end of the screw shaft 130 such that the following gear slides on an outer circumferential surface of the screw shaft 130. Additionally, the stop ring 132 is formed on the outer circumferential surface of the screw shaft 130 at a location above the following gear 131, and as mentioned above, the elastic support member 140 is provided between the following gear 131 and the stop ring 132 so as to elastically support the following gear 131.

In addition, the function of a clutch of the second embodiment of the present invention will be described hereinbelow. When pressure of the pressure chamber is greater than an elastic force of the elastic support member 140, the following gear 131 lifts along the outer circumferential surface of the screw shaft 130, and the driving gear 311 and the following gear 131 become spaced apart from each other, thereby temporarily stopping transmission of the rotation driving force to the screw shaft 130. Then, when the pressure of the pressure chamber is released, the following gear 131 is lowered by a restoring force of the elastic support member 140, and meshes with the driving gear 311. Accordingly, the function of a clutch is performed, and thus the stagnation of the lubricant can be avoided.

Furthermore, since the elastic support member 140 elastically supports the following gear 131 on the following gear 131, it is possible to efficiently perform the function of a clutch by promptly responding to a change of pressure due to difference in amounts of lubricants in the pressure chamber.

As described above, the present invention is intended to propose the lubricant injector, in which the lubricant injector can perform the extrusion and pumping of lubricant at the same time by using a single power source, and perform the function of a clutch for responding to the change of pressure due to difference in the amounts of the lubricants caused by the extrusion and pumping.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present invention relates generally to a lubricant injector. More particularly, a lubricant injector of the present invention can be used at a location that requires lubricating due to mechanical friction, thereby enabling automatic injection of lubricant.

What is claimed is:

1. A lubricant injector comprising:
a storage unit (100) including: a storage chamber (110) filled with a lubricant; a piston (120) provided in the storage chamber (110); a screw shaft (130) coupled to the piston (120) so as to lift and lower the piston (120) while rotating; a following gear (131) provided on a lower end of the screw shaft (130); and an elastic support member (140) provided on one side of the screw shaft (130) so as to elastically support the following gear (131);
a power generation unit (200) provided on one side of a lower portion of the storage unit (100) so as to provide a rotation driving force; and
an emission unit (300) including: a cylindrical cam (310) rotating by operating in conjunction with the power generation unit (200); a driving gear (311) provided on an upper end of the cylindrical cam (310), the driving gear meshing with the following gear (131) such that a space (S) through which the lubricant is introduced into the cylindrical cam (310) is defined; a plunger (320) pumping the introduced lubricant while moving up and down in the cylindrical cam (310) by operating in conjunction with the cylindrical cam (310) that rotates; and a discharge passage (330) formed in the plunger (320) such that the pumped lubricant can be discharged to target locations,
wherein the following gear (131) and the driving gear (311) intermittently mesh with each other according to a change of pressure in the storage chamber (110).

2. The lubricant injector of claim 1, wherein the storage chamber (110) comprises: a body (111) filled with the lubricant and having an outlet hole (E) formed at a predetermined portion of a lower part of the body (111); and a cover (112) removably provided on an upper part of the body (111).

3. The lubricant injector of claim 2, wherein the elastic support member (140) is provided between the screw shaft (130) and the cover (112).

4. The lubricant injector of claim 1, wherein the elastic support member (140) is provided between the following gear (131) that is installed on the lower end of the screw shaft (130) such that the following gear slides on an outer circumferential surface of the screw shaft (130), and a stop ring (132) formed on the outer circumferential surface of the screw shaft (130) at a location above the following gear (131).

5. The lubricant injector of claim 1, wherein the discharge passage (330) is provided with a first check valve (331) to enable unidirectional discharge of the lubricant.

6. The lubricant injector of claim 1, wherein the cylindrical cam (310) is provided with an auxiliary discharge passage (400) thereunder that communicates with the discharge passage (330), the auxiliary discharge passage being provided with a second check valve (410) that enables unidirectional discharge of the lubricant.

7. The lubricant injector of claim 1, wherein the piston (120) is provided with a lubricant hole (121) formed through the piston so as to supply the lubricant to a part under the piston, with a stopper (122) removably installed in the lubricant hole (121).

8. The lubricant injector of claim 1, wherein the power generation unit (200) comprises: a driving motor (210); a reduction gear (220) operating in conjunction with the driving motor (210); and a pinion (230) causing cooperation of the reduction gear (220) and the cylindrical cam (310).

* * * * *